(12) United States Patent
Krajnc et al.

(10) Patent No.: US 12,156,078 B2
(45) Date of Patent: Nov. 26, 2024

(54) WIRELESS PARAMETER ADJUSTMENT BASED ON NODE LOCATION

(71) Applicant: SIGNIFY HOLDING B.V., Eindhoven (NL)

(72) Inventors: Hugo Jose Krajnc, Eindhoven (NL); Dzmitry Viktorovich Aliakseyeu, Eindhoven (NL); Berent Willem Meerbeek, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 308 days.

(21) Appl. No.: 17/629,978

(22) PCT Filed: Jul. 14, 2020

(86) PCT No.: PCT/EP2020/069868
§ 371 (c)(1),
(2) Date: Jan. 25, 2022

(87) PCT Pub. No.: WO2021/018564
PCT Pub. Date: Feb. 4, 2021

(65) Prior Publication Data
US 2022/0256402 A1      Aug. 11, 2022

(30) Foreign Application Priority Data

Aug. 1, 2019   (EP) ..................... 19189526

(51) Int. Cl.
*H04W 4/02*      (2018.01)
*H04W 28/18*     (2009.01)

(52) U.S. Cl.
CPC .......... *H04W 28/18* (2013.01); *H04W 4/023* (2013.01)

(58) Field of Classification Search
None
See application file for complete search history.

(56) References Cited

U.S. PATENT DOCUMENTS

| 8,710,984 B2 | 4/2014 | Wilson et al. |
| 9,841,501 B1 | 12/2017 | Salour et al. |
| 2008/0157957 A1 | 7/2008 | Pitchers et al. |

(Continued)

FOREIGN PATENT DOCUMENTS

| WO | 2011154906 A1 | 12/2011 |
| WO | 2014193216 A1 | 12/2014 |

(Continued)

*Primary Examiner* — Minh Trang T Nguyen (57) ABSTRACT

The present invention relates to adjusting one or more wireless parameters of one or more nodes (12, 14, 16) based on one or more node parameters including a relative location of the one or more of the nodes (12, 14, 16). The nodes (12, 14, 16) are wirelessly connected in a wirelessly connected system (100) and configured for transmitting radio frequency (RF) signals (18), receiving RF signals (18), or both. The one or more wireless parameters are adjusted such that the wireless performance of the one or more of the nodes (12, 14, 16) is optimized for an application of the wirelessly connected system (100). Transmission power can be adjusted such that a probability of detecting an event in a volume (212, 222) not to be covered by the one or more of the nodes (12, 14, 16) is reduced, allowing reduction of false positives from non-covered volumes (212, 222).

11 Claims, 4 Drawing Sheets

(56) References Cited

U.S. PATENT DOCUMENTS

| | | |
|---|---|---|
| 2012/0146788 A1 | 6/2012 | Wilson et al. |
| 2013/0237245 A1 | 9/2013 | Tinnakornsrisuphap et al. |
| 2018/0235117 A1* | 8/2018 | Feri .................. H05B 47/105 |
| 2019/0166562 A1 | 5/2019 | Rajendran et al. |

FOREIGN PATENT DOCUMENTS

| | | |
|---|---|---|
| WO | 2014193217 A1 | 12/2014 |
| WO | 2015114123 A1 | 8/2015 |

* cited by examiner

FIG. 3

WIRELESS PARAMETER ADJUSTMENT BASED ON NODE LOCATION

CROSS-REFERENCE TO PRIOR APPLICATIONS

This application is the U.S. National Phase application under 35 U.S.C. § 371 of International Application No. PCT/EP2020/069868, filed on Jul. 14, 2020, which claims the benefit of European Patent Application No. 19189526.7, filed on Aug. 1, 2019. These applications are hereby incorporated by reference herein.

FIELD OF THE INVENTION

The present invention relates to a wireless parameter adjustment device, a wirelessly connected system, a method for adjusting one or more wireless parameters of one or more nodes of a wirelessly connected system, and a computer program product for adjusting one or more wireless parameters of one or more nodes of a wirelessly connected system.

BACKGROUND OF THE INVENTION

Wirelessly connected systems are inter alia used in home automation. Nodes of the wirelessly connected systems can be wirelessly connected to a remote control device, such as a smartphone or to a router or gateway such that a user can remotely control the wirelessly connected system. The nodes of the wirelessly connected systems can for example be used for performing radio frequency (RF) based sensing or asset tracking.

US 2012/0146788 A1 shows systems and methods for device-free motion detection and presence detection within an area of interest. A plurality of nodes, configured to be arranged around the area of interest, form a wireless network. The plurality of nodes transmits wireless signals as radio waves and receive transmitted wireless signals. The received signal strength (RSS) of the transmitted wireless signals between the plurality of nodes is measured and a value is reported. A computing device receives the reported values for the measured RSS and tracks the reported values over time. The computing device processes the reported values using an aggregate disturbance calculation to detect motion and presence within the area of interest.

US 2019/166562 discloses a method for dynamically controlling transmit power of a wireless transmitter, e.g. based on the change in power level and the change in interference level at each of a set of sensors. A change in the transmit power of the wireless transmitter may be dynamically effected based on a required change.

The wireless performance of the wirelessly connected system affects whether the user can reliably control the wirelessly connected system and whether RF-based sensing, such as motion detection and presence detection, can be reliably performed.

SUMMARY OF THE INVENTION

It can be seen as an object of the present invention to provide a wireless parameter adjustment device, a wirelessly connected system, a method, a computer program product, and a computer readable medium which allow to provide an improved wireless transmission performance, an improved wireless reception performance, or both.

In a first aspect of the present invention a wireless parameter adjustment device for a wirelessly connected system including wirelessly connected nodes is presented. The wirelessly connected nodes are configured for transmitting RF signals, receiving RF signals, or both. The wireless parameter adjustment device is configured for adjusting one or more wireless parameters of one or more of the nodes based on one or more node parameters including a relative location of the one or more of the nodes, such that the wireless performance of the one or more of the nodes is optimized for an application of the wirelessly connected system.

Since the wireless parameter adjustment device is configured for adjusting one or more wireless parameters of one or more of the nodes based on one or more node parameters including a relative location of the one or more of the nodes, the wireless parameter adjustment device can affect the wireless performance of the wirelessly connected system. Adjusting the wireless parameters of the one or more of the nodes can allow a symmetric or at least homogeneous wireless performance across the nodes at different relative locations. Furthermore, the wireless performance of each of the nodes can be optimized for an application where a symmetric wireless performance might be needed or desired. The wireless performance can include wireless transmission performance and wireless reception performance. The wireless performance can in particular be improved for residential wirelessly connected systems where compared to wirelessly connected systems in offices, there is usually a large diversity of materials, relative locations, and designs used for the nodes of the wirelessly connected systems. Adjusting the one or more wireless parameters of the one or more of the nodes can furthermore allow sustaining a healthy mesh routing network and optimizing detection and reliability of RF-based sensing and asset tracking.

The relative location describes where a respective node is arranged with respect to its environment. The relative location includes information about the environment of the node. The environment can include one or more other nodes or one or more objects influencing the RF signals, such as a wall, a window, a ceiling, a metal beam, an appliance, a furniture, or another object which influences the RF signals transmitted and received by the nodes. The relative location can include a position of the node with respect to the one or more other nodes or the one or more objects influencing the RF signals. The relative location of the one or more of the nodes can for example be a position of a node in a room with walls, a floor, and a ceiling. The relative location can include an arrangement of the respective node at a wall, a ceiling, a floor, a table, or any other location. For example, when the node is a luminaire, the luminaire can be arranged at different locations, such that the luminaire can be a wall mounted luminaire, a ceiling mounted luminaire, a pendant, a table luminaire, a side luminaire, a portable luminaire dynamically moved around a volume and thus dynamically changing its relative location, or others. The relative location of a node with respect to one or more other nodes can for example be determined based on a grouping or clustering of the nodes, e.g., grouping of luminaires within a chandelier.

Applications of the wirelessly connected systems can include RF-based sensing, asset tracking, wirelessly communicating between the nodes, or other applications.

The one or more wireless parameters can include one or more of: transmission (Tx) power, number of antennas used for generating RF signals, type of antennas used for generating RF signals, frequency channel or frequency channels, bandwidth, reception (Rx) sensitivity.

The wireless adjustment device can for example be configured for adjusting the Tx power of the one or more nodes based on the relative location of the respective node. For example, the device can reduce the Tx power of a wall mounted node compared to the Tx power of a ceiling mounted node, as the wall mounted node has a more transversal impact and the ceiling mounted node sees objects below it as comparatively smaller targets. This allows improving RF-based sensing performance of the wirelessly connected system.

The one or more node parameters can include one or more of: an orientation of the one or more of the nodes, an antenna design of the one or more of the nodes, a directionality of an RF signal generated by the one or more of the nodes, a polarization of an RF signal generated by the one or more of the nodes, a multiple input multiple output (MIMO) characteristic of the one or more of the nodes, one or more materials of the one or more of the nodes, a connectivity of the one or more of the nodes to one or more other nodes, a probability of detecting an event in a volume not to be covered by the one or more of the nodes, a confidence level of an event detected by the one or more of the nodes, a contextual parameter of the one or more of the nodes, an amount of nodes at different relative locations, a current Tx power, current Rx sensitivity, a frequency channel or frequency channels, bandwidth.

Instead of current values of parameters, the node parameters can also include trends of the respective node parameters, such as patterns over a certain time period. This allows to avoid adjusting wireless parameters too often, as changes of the node parameters can be considered for a longer time and adjustment of wireless parameters may be performed less frequently.

The orientation of the one or more of the nodes can include an orientation of the one or more of the nodes with respect to a specific volume, to one or more other nodes, to one or more objects, or a combination thereof. The directionality of the RF signal generated by the one or more of the nodes can be an inherent directionality of the respective node depending on the node design. For example, if the node is a luminaire, bulb design can influence the directionality of RF signals generated by the luminaire. The materials of the nodes can additionally or alternatively influence the directionality by disturbing the RF signals in certain directions. The materials of the nodes can for example include one or more materials of the housing of the node. The connectivity of the one or more of the nodes to one or more other nodes can include a data transfer rate between the nodes, such as a data transfer rate required for wirelessly communicating between the nodes in real time. For example, if the data transfer rate between the nodes is below the one required for communicating in real time, wireless parameters may be adjusted in order to increase the data transfer rate. The connectivity of the one or more of the nodes to one or more other nodes can also for example include a number of retries for transmitting data—For example, the nodes may have a worse connectivity if a higher number of retries is required for transmitting data.

The wireless parameter adjustment device can be configured for decreasing the Tx power of the one or more of the nodes based on the connectivity of the one or more of the nodes to one or more other nodes. This can allow to reduce possible connectivity issues by avoiding that Tx power is reduced too much. The wireless parameter adjustment device can be configured for decreasing the Tx power of the one or more of the nodes only to a threshold Tx power based on the connectivity of the one or more of the nodes to one or more other nodes. The threshold Tx power can be selected such that an overall proportion of Tx power is as high as possible without significantly reducing connectivity of the one or more of the nodes.

The wireless parameter adjustment device can be configured for adjusting the Tx power of the one or more of the nodes based on an amount of nodes at different relative locations in the wirelessly connected system or an amount of nodes at different relative locations of a group of nodes in the wirelessly connected system. A group of nodes in the wirelessly connected system can for example include a group of or all nodes arranged in a room, on a floor, in a house, or the like. For example, a group of nodes can include a ceiling mounted node and four table nodes. If the ceiling mounted node is arranged in a center of a room and the four table nodes are distributed in the room, the overall relative increase of Tx power of the ceiling mounted node is higher than if there were three ceiling mounted nodes. This allows ensuring that a RF-based sensing spatial wireless performance throughout the volume can be kept as homogeneous as possible. This for example allows detecting a person with equal confidence levels throughout an entire room as opposed to having blind spots in the center due to the proportionally lower relative wireless transmission performance of the ceiling mounted node.

The wireless parameter adjustment device can be configured for adjusting the Tx power based on a confidence level of an event detected by the one or more of the nodes, e.g., a sensing event such as presence detection. The confidence level of the event can be provided from the one or more of the nodes to the wireless parameter adjustment device. Alternatively or additionally, the wireless parameter adjustment device can be configured for determining the confidence level of the event detected by the one or more of the nodes. For example, for a low confidence level, Tx power of a node arranged at a wall of a room adjacent to one or more rooms can be decreased, while for high confidence, Tx power may be not adjusted. This can allow to avoid detecting false positive events in the rooms adjacent to the room in which the event is to be correctly detected. The wireless parameter adjustment device can include a source for verifying the confidence level or be connected to a source for verifying the confidence level. The source for verifying the confidence level, e.g., high or low confidence, can for example be a ground truth mechanism, such as another sensing modality covering the same volume or it can be based on manual user input.

The wireless parameter adjustment device can be configured for adjusting the one or more wireless parameters of the one or more nodes based on a contextual parameter. Contextual parameter can include a currently available bandwidth, a time of day, weather conditions, temperature, or other contextual data. This allows to improve the wireless performance by considering context and adjusting the wireless parameters accordingly, for example, as temperature may influence the wireless performance of the nodes.

The wireless parameter adjustment device can be configured for adjusting the one or more wireless parameters of the one or more of the nodes, such that a signal parameter of the RF signals outside of a volume that is to be covered by the one or more of the nodes has a value below a threshold value. The signal parameter of the RF signals can for example be signal strength. The wireless parameter adjustment device can also be configured for adjusting the one or more wireless parameters of the one or more of the nodes, such that signal parameters of the RF signals outside a volume that is to be covered by the one or more of the nodes have values below respective threshold values for the respective signal parameters. The signal parameters can also include signal-to-noise ratio (SNR), carrier frequency bandwidth, carrier frequency shift, or any other signal parameter. This allows to reduce the risk that RF signals leak from the volumes that they are intended for. This may increase data security as the risk of data sniffing is reduced. Additionally, disturbance of the RF signals of nodes that cover adjacent volumes can be reduced. Furthermore, this can reduce detecting false positive events from adjacent volumes in case that the nodes are used for event detection. The threshold signal strength can be predetermined. The threshold signal strength can for example be chosen such that a value of an RSS indicator (RSSI) outside of the volume to be covered is of the order of noise, such that no information is obtained from adjacent volumes not to be covered.

The signal parameters of the RF signals can for example be determined by a node of the wirelessly connected system outside of the volume that is to be covered by the one or more of the nodes.

The wireless parameter adjustment device can be configured for adjusting the one or more wireless parameters of the one or more of the nodes, such that a probability of detecting an event in a volume not to be covered by the one or more of the nodes is reduced. The nodes can for example be configured for performing RF-based sensing, e.g., detecting events, such as detecting a presence of a person. The nodes can be arranged around a volume for performing RF-based sensing in the volume and to thereby cover the volume. Adjacent volumes shall not be covered by the RF-based sensing. However, it is possible that the nodes detect false positive events, i.e., events in the volume not to be covered by the one or more of the nodes. Adjusting the one or more wireless parameters of the one or more of the nodes, such that a probability of detecting an event in a volume not to be covered by the one or more of the nodes is reduced, allows to reduce the number of detected false positive events in volumes, e.g., rooms, adjacent to the volume covered by the nodes. For example, the wireless parameter adjustment device can be configured for adjusting the one or more wireless parameters of the one or more of the nodes such that a relative Tx power of RF signals transmitted by the one or more of the nodes decreases based on a distance to a center of a volume covered by the one or more of the nodes. In this case, both the distance of the respective node to the center of the volume covered by the one or more of the nodes, as well as the relative location of the respective node with respect to its environment is decisive for adjusting the Tx power of the RF signals transmitted by the respective node. If the nodes are arranged such that the covered volume corresponds to the volume of a room, adjacent volumes of other rooms shall not be covered. If the Tx power of RF signals generated by a node far away from the center and close to an adjacent room is high, there is a higher probability that the node detects a false positive event in the adjacent room. Decreasing Tx power of nodes based on a distance to a center of a volume covered by the one or more of the nodes can allow to reduce the number of detected false positive events.

The wireless parameter adjustment device can be configured for determining the relative location of the one or more of the nodes. Since the wireless parameter adjustment device can be configured for determining the relative location of the one or more of the nodes, the relative location of the one or more of the nodes can be considered by the wireless parameter adjustment device when adjusting the one or more wireless parameters of the one or more of the nodes. The relative location of the node can be manually or automatically determined. The relative location of the node can for example be manually inserted by the user, e.g., via a user interface, such as a user input device with a touch screen or display and keyboard. The relative location can also be determined automatically, e.g., based on tracking the position and environment of the node, e.g., via a camera and image analysis unit, or in any other manner known to the skilled person. Alternatively or additionally, the relative location can be a node parameter stored for each node on the node, e.g., during production of the node, arrangement of the node, or both. Alternatively or additionally, the nodes can be configured for determining their relative location. For example, a node can comprise a microphone for determining a distance to another node. For example, a node in form of a television can wirelessly transmit a current volume setting to another node with the microphone and the microphone can determine a received volume. The difference of volume setting and received volume can be used to determine a distance between the node and the television. The nodes can be configured for providing their relative location to the wireless parameter adjustment device.

The wireless parameter adjustment device can be configured for determining a probability of detecting an event in a volume not to be covered by the one or more of the nodes based on the one or more node parameters including the relative location of the one or more of the nodes. The wireless parameter adjustment device can, for example, be configured for adjusting the Tx power based on the probability of detecting an event in a volume not to be covered by the one or more of the nodes. This can allow to avoid detecting false positive events in rooms adjacent to the room in which the event is to be correctly detected.

The wireless parameter adjustment device can be configured for adjusting the one or more wireless parameters of the one or more nodes if a trigger event is detected. The trigger event can be provided to the wireless parameter adjustment device. Trigger events can for example include a user manually triggering an adjustment of the one or more wireless parameters, or a node being replaced, removed, malfunctioning, activated, or deactivated. This allows keeping the wireless parameters up-to-date.

In a further aspect of the present invention a wirelessly connected system is presented. The wirelessly connected system comprises two or more nodes and the wireless parameter adjustment device according to claim 1 or any embodiment of the wireless parameter adjustment device. The two or more nodes are configured for transmitting RF signals, receiving RF signals, or both. The wirelessly connected system can allow an improved wireless transmission performance, an improved wireless reception performance, or both.

In one embodiment of the wirelessly connected system, each of the nodes can be configured for initially transmitting RF signals with maximal Tx power. The wireless parameter adjustment device can be configured for decreasing the Tx power of one or more of the nodes based on the one or more node parameters including the relative location of the one or more of the nodes.

The wirelessly connected system can further comprise a camera and an image analysis unit. The camera can be configured for imaging an arrangement of the nodes, the nodes, or both. The image analysis unit can be configured for determining one or more of: a relative location of one or more of the nodes, a material of one or more of the nodes, an orientation of one or more of the nodes, an amount of nodes at different relative locations. This can allow to automatically determine relative location, material, and/or orientation of the one or more of the nodes and/or the amount of nodes at different relative locations.

The wirelessly connected system is configured for performing RF-based sensing, asset tracking, or both. RF-based sensing can for example include applications such as proximity detection, motion detection, presence detection, object counting, or other RF-based sensing.

In a further aspect of the present invention a method for adjusting one or more wireless parameters of one or more nodes of a wirelessly connected system is presented. The nodes are configured for transmitting RF signals, receiving RF signals, or both. The method comprises the step:
  adjusting the one or more wireless parameters of one or more of the nodes based on one or more node parameters including a relative location of the one or more of the nodes, such that the wireless performance of the one or more of the nodes is optimized for an application of the wirelessly connected system.

The method allows for adjusting available wireless parameters in order to compensate for different wireless performances of the nodes, to mitigate the difference between the performance of different nodes and to enhance an overall wireless performance of the wirelessly connected system. For example, Tx power of RF signals can be optimized for each node covering a volume in order to improve overall wireless performance of the wirelessly connected system.

The method can be performed as an algorithm or as part of an algorithm. The algorithm can for example be executed on a processor of a general purpose computer, a system on a chip (SoC), or an application-specific integrated circuit (ASIC).

The method can comprise the step:
  determining one or more node parameters including a relative location of the one or more of the nodes.

Determining the relative location of the one or more of the nodes can be performed manually or automatically. Other node parameters that can be determined can include one or more of: an orientation of the one or more of the nodes, an antenna design of the one or more of the nodes, a directionality of a RF signal generated by the one or more of the nodes, a polarization of the RF signal generated by the one or more of the nodes, a MIMO characteristic of the one or more of the nodes, one or more materials of the one or more of the nodes, a connectivity of the one or more of the nodes to one or more other nodes, a probability of detecting an event in a volume not to be covered by the one or more of the nodes, a confidence level of an event detected by the one or more of the nodes, a contextual parameter of the one or more of the nodes, an amount of nodes at different relative locations, a current Tx power, current Rx sensitivity, a frequency channel or frequency channels, and bandwidth.

In a further aspect of the present invention a computer program product for adjusting one or more wireless parameters of one or more nodes of a wirelessly connected system is presented. The nodes are configured for transmitting RF signals, receiving RF signals, or both. The computer program product comprises program code means for causing a processor to carry out the method as defined in claim 12 or any embodiment of the method, when the computer program product is run on the processor.

In a further aspect a computer readable medium having stored the computer program product of claim 14 is presented. Alternatively or additionally the computer readable medium can have the computer program product according to any embodiment of the computer program product stored.

It shall be understood that the wireless parameter adjustment device of claim 1, the wirelessly connected system of claim 8, the method of claim 12, the computer program product of claim 14, and the computer readable medium of claim 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1A:
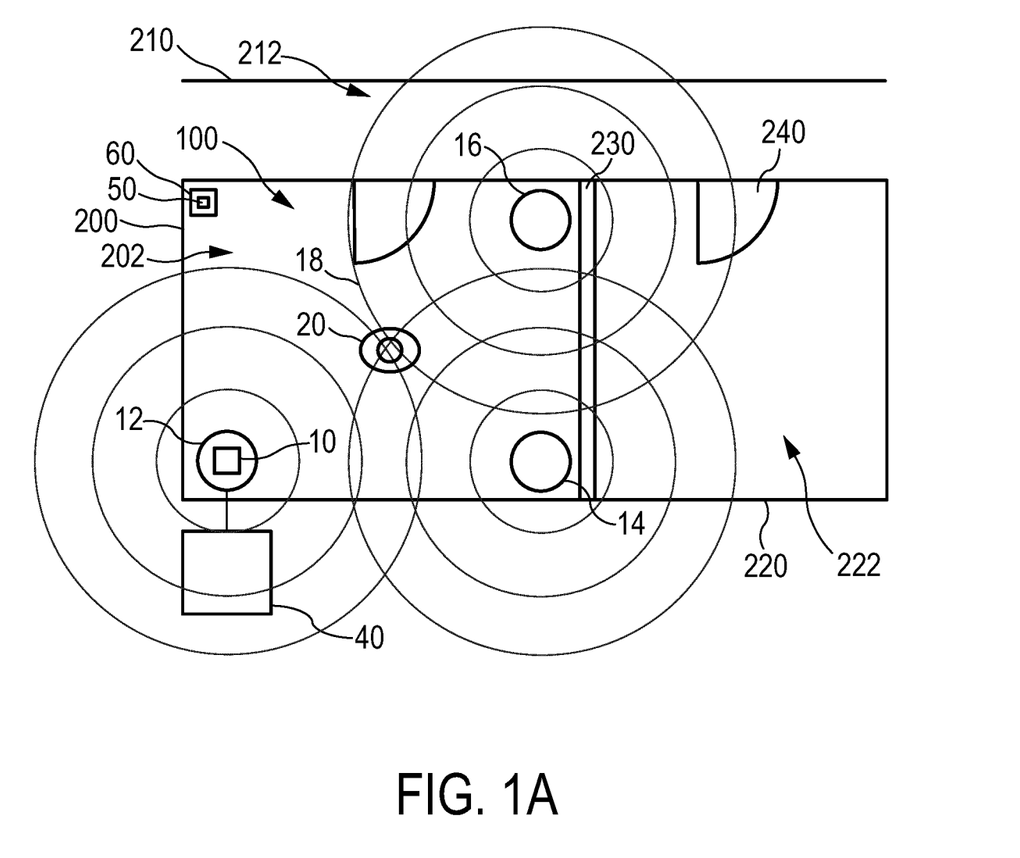
FIG. 1A shows schematically and exemplarily an embodiment of a wirelessly connected system with a wireless parameter adjustment device included in a node of the wirelessly connected system arranged in a building with several rooms and a person in a first room.
Figure 1B:
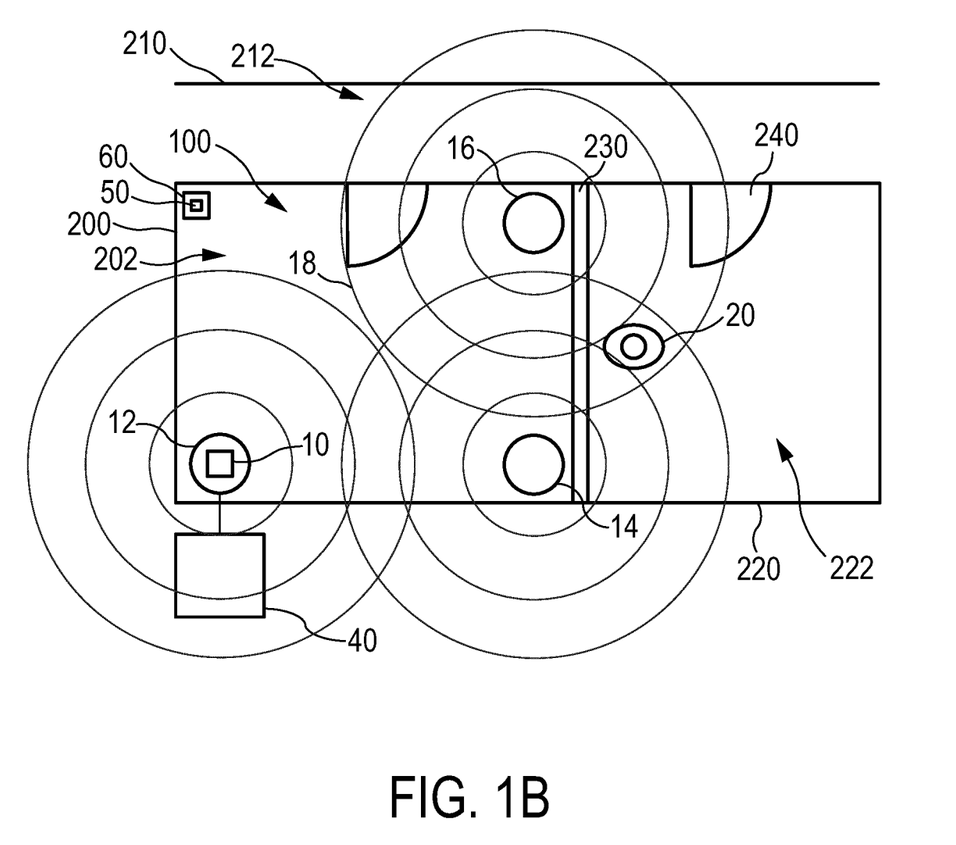
FIG. 1B shows the wirelessly connected system of FIG. 1A with the person in a second room.

FIGS. 1A and 1B show schematically and exemplarily an embodiment of a wirelessly connected system in form of a connected lighting (CL) system 100 with a wireless parameter adjustment device 10.

The CL system 100 includes three wirelessly connected nodes in form of a Hue bridge 12, and two wall mounted luminaires 14 and 16 for transmitting and receiving RF signals 18. In other embodiments, the wirelessly connected system can also include more nodes. The wireless parameter adjustment device 10 is included in the Hue bridge 12 in this embodiment and additionally performs functions of the Hue bridge 12. In other embodiments the wireless parameter adjustment device may also be a standalone device or it can be embedded and distributed among the different nodes. In this embodiment the Hue bridge 12 is connected to a server 40. The server 40 allows the CL system 100 to connect with the Internet. In other embodiments, the Hue bridge 12 can also be connected to the Internet in any other manner.

The Hue bridge 12 and the luminaires 14 and 16 are arranged in a first room 200 and cover the respective volume 202 which is limited by the walls, floor, and ceiling of room 200. The first room 200 is adjacent to a corridor 210 and a second room 220, which define respective adjacent volumes 212 and 222. The rooms 200 and 220 are separated from each other via wall 230 and connected to the corridor 210 via doors 240. In other embodiments, further nodes of the wirelessly connected system can be arranged in other rooms, such as in the corridor and the floor. In this case, a subset of nodes of the wirelessly connected system, namely the nodes in each room preferably forms a group of nodes for covering the respective volume.

In this embodiment, the CL system 100 is used for RF-based sensing, in particular, for presence detection. Therefore, the RF signals 18 are transmitted between the luminaires 14 and 16 and the Hue bridge 12. A disturbance of the RF signals 18 caused by a person 20 is analyzed in order to detect the presence of person 20 in the first room 200. In other embodiments, presence detection can be performed by groups of nodes which cover other volumes, such that one of the volumes in which the person is detected can be determined in dependence of the node or nodes of which group detected the presence.

In other embodiments, the wirelessly connected system can also be configured for performing asset tracking or any other application using the RF signals of the nodes arranged in the wirelessly connected system. The wirelessly connected system can also be configured for performing RF-based sensing and asset tracking.

In this embodiment, each of the nodes, i.e., the luminaires 14 and 16, and the Hue bridge 12 initially transmit RF signals with maximal Tx power. In other embodiments, the nodes can transmit with predetermined values of Tx power which may be different for each of the nodes.

The wirelessly connected system additionally includes a camera 50 and an image analysis unit 60. In this embodiment, the camera 50 is included in the image analysis unit 60. The camera 50 and the image analysis unit 60 are optional. The camera 50 images the arrangement of the luminaires 14 and 16, and the Hue bridge 12 in order to generate images of the luminaires 14 and 16, and the Hue bridge 12 as well as of their arrangement with respect to their environment. The images are provided to the image analysis unit 60 which determines node parameters including the relative locations of the luminaires 14 and 16, and the Hue bridge 12, as well as their materials, orientations, and the amount of nodes at different relative locations. The image analysis unit 60 can provide the node parameters to the wireless parameter adjustment device 10. In this embodiment the image analysis unit 60 includes a wireless transceiver for wirelessly transmitting the node parameters to the wireless parameter adjustment device 10 (not shown). In other embodiments, the image analysis unit can also be included in the wireless parameter adjustment device and the wireless adjustment device can be configured for determining the relative locations of the nodes. In yet other embodiments, node parameters including the relative locations of the nodes and other node parameters can be inserted manually by a user, e.g., via a user interface such as a touch display (not shown).

Figure 2:
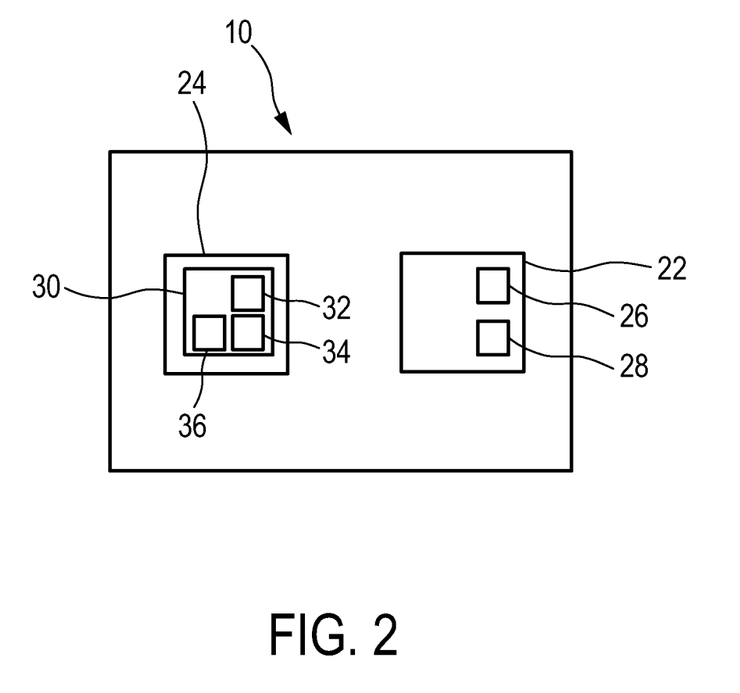
FIG. 2 shows schematically and exemplarily details of the embodiment of the wireless parameter adjustment device of the wirelessly connected system of FIGS. 1A and 1B.

FIG. 2 shows schematically and exemplarily details of the embodiment of the wireless parameter adjustment device 10. The wireless parameter adjustment device 10 is used for adjusting Tx power of the luminaires 14 and 16 and the Hue bridge 12 based on their relative locations such that a signal strength of the RF signals 18 outside of the volume 202 that is to be covered by the luminaires 14 and 16 and Hue bridge 12 is below a threshold signal strength. The relative location describes where the respective node is arranged with respect to its environment. The threshold signal strength is chosen in order to avoid leakage of RF signals to volumes 212 and 222 that are not to be covered by the nodes. The signal strength of the RF signals 18 decreases with distance to its respective source, i.e., the luminaires 14 or 16 or the Hue bridge 12 and is further decreased by absorption, diffraction, and reflection at objects, such as the wall 230 (cf. FIGS. 1A and 1B).

In other embodiments the wireless parameter adjustment device can also be used for adjusting one or more wireless parameters of one or more of the nodes based on one or more node parameters including a relative location of the one or more of the nodes in order to optimize the wireless performance of the node or nodes for a specific application of the CL system. Other wireless parameters can for example include a number of antennas used for generating RF signals, a type of antennas used for generating RF signals, a frequency channel or frequency channels, bandwidth, and Rx sensitivity. The adjusting of the one or more wireless parameters of the one or more of the nodes can be performed under an additional requirement, namely, such that a signal parameter of the RF signals outside of a volume that is to be covered by the one or more of the nodes has a value below a threshold value. Signal parameters can for example be or include a signal strength, SNR, carrier frequency shift, carrier frequency bandwidth, or any other signal parameter.

The wireless parameter adjustment device 10 includes a control unit 22 and a transceiver unit 24. The transceiver unit 24 is optional. In other embodiments, the wireless parameter adjustment device 10 can use a transceiver unit of a node in which the wireless parameter adjustment device is included.

The control unit 22 includes a processor 26 and a computer readable medium in form of memory 28.

The transceiver unit 24 includes a transceiver in form of WiFi transceiver 30. The WiFi transceiver 30 can be operated with different frequencies. In this embodiment the WiFi transceiver 30 can be operated in the 2.4 GHz band, the 5 GHz band, and the 60 GHz band. The WiFi transceiver 30 therefore has antennas 32, 34, and 36 for the respective WiFi bands. The WiFi transceiver can also include antenna arrays including multiple antennas for each frequency band. The transceiver unit 24 transmits RF signals 18 to the luminaires 14 and 16 and receives RF signals 18 from luminaires 14 and 16 in order to wirelessly communicate with the luminaires 14 and 16.

In other embodiments the transceiver unit may also include two or more transceivers, e.g. a narrowband transceiver and a wideband transceiver. Additionally or alternatively, the transceiver unit can include one or more transceivers using ZigBee, thread, Bluetooth low energy (BLE), or other communication protocols.

In the following it is disclosed in more details how the wireless parameter adjustment device 10 adjusts the Tx power based on the relative location of the luminaires 14 and 16 and the Hue bridge 12.

The memory 28 stores a computer program product for adjusting one or more wireless parameters of one or more nodes of the CL system. The computer program product includes program code means for causing processor 26 to carry out a method for adjusting one or more wireless parameters of one or more nodes of the CL system when the computer program product is run on the processor 26, e.g., the method as presented in FIG. 3. The memory 28 further includes a computer program product for operating the CL system 100 which includes controlling the luminaires 14 and 16 of the CL system in order to provide lighting, and the nodes of the CL system 100 to perform RF-based sensing, and asset tracking.

Furthermore, the memory 28 stores the relative locations of the nodes. In other embodiments, the memory 28 can also store additional node parameters including one or more of: orientations of the nodes, antenna designs of the nodes, directionality of the RF signals generated by the nodes, polarization of the RF signals generated by the nodes, MIMO characteristics of the nodes, materials of the nodes, connectivity of the nodes to other nodes, probabilities of detecting events in volumes not to be covered by the nodes, confidence levels of events detected by the nodes, contextual parameters of the nodes, an amount of nodes at different relative locations, a current Tx power, a frequency channel or frequency channels, bandwidth, and Rx sensitivity.

In this embodiment, the processor 26 receives the relative locations of the luminaires 14 and 16 and the Hue bridge 12 from memory 28. The processor 26 then adjusts the Tx power of the luminaires 14 and 16, and the Hue bridge 12 based on their relative locations. In order to avoid leakage of the RF signals 18 to volumes 212 and 222 that are not to be covered by the luminaires 14 and 16 and the Hue bridge 12 Tx power of the luminaires 14 and 16, and the Hue bridge 12 is decreased. In particular, as luminaires 14 and 16 and Hue bridge 12 in this embodiment transmit the RF signals 18 with maximal Tx power, the Tx power is decreased individually for each node, such that a signal strength of the RF signals 18 outside of the volume 202 that is to be covered by the luminaires 14 and 16 and the Hue bridge 12 is below a threshold signal strength. This also allows to reduce a probability of detecting an event in form of a presence detection in the adjacent volumes 212 and 222 which shall not be covered by the luminaires 14 and 16, and the Hue bridge 12.

FIG. 1B shows a situation, in which the person 20 is present in the second room 220. In case that the signal strength of the RF signals 18 of luminaires 14 and 16 would be high in the adjacent volume 222, there is a high probability of falsely detecting an event in form of the presence of person 20 in room 200, i.e., in the volume 202 that is to be covered by the luminaires 14 and 16, and Hue bridge 12. By reducing the Tx power, also the signal strength of the RF signals 18 outside of the volume 202 is reduced, such that the risk of detecting false positive events is mitigated.

In other embodiments, the processor 26 can also be provided with additional node parameters from the memory 28 and adjust one or more wireless parameters based on the relative location and the additional node parameters.

In other embodiments, the wireless parameter adjustment device can further be configured for determining a probability of detecting an event, e.g., detecting presence of a person, in a volume not to be covered by the nodes based on the node parameters including the relative location of the nodes.

In this embodiment, the processor 26 adjusts the Tx power of the nodes in the CL system 100, whenever a trigger event is detected. Trigger events include a user requesting to adjust one or more wireless parameters, turning on or off one node, i.e., one of the luminaires 14 and 16, and the Hue bridge 12, removing a node, or adding a node.

In the following various other embodiments of the wirelessly connected system and wireless parameter adjustment device are described.

In one embodiment, the wirelessly connected system is used for performing RF-based sensing for detecting presence of a user using luminaires placed in a living room. The presence is detected by determining dynamic variations of RSSI in messages transmitted between the luminaires. The wirelessly connected system determines the relative location of each luminaire involved. These can for example be: wall mounted, ceiling mounted, pendant, table light, cove light, portable, or other locations. The relative location relates to where the luminaire is arranged with respect to other nodes and/or other objects. The relative location can be stored during a late-stage configuration of a luminaire in the production facility or it can be retrieved by a light control system, such as a Hue bridge, gateway, or remote control unit, such as a smart phone, during usage. It is also possible that users provide the relative location, for example using a smart phone app, where they indicate the relative location for a respective luminaire. The wireless parameter adjustment device can then determine how Tx power for each of the luminaires needs to be adjusted in order to optimize the wireless performance of the wirelessly connected system and adjust the Tx power accordingly. For example, Tx power of ceiling mounted lights can be increased as they would overall see human bodies as a smaller target because of a top down view compared to, e.g., wall mounted or table lights which can have a more transversal impact. This allows the wirelessly connected system to ensure that ceiling lights can contribute proportionally as much as other lights, meaning that the RF sensing mechanism can have overall richer data than before.

In another embodiment, all luminaires can be configured for transmitting at their maximal Tx power, e.g. hardware (HW) defined or limited by regional regulations. In this case, further increasing Tx power for any luminaire, in particular ceiling mounted luminaires is not possible. This additional node parameter can be taken into account when adjusting the wireless parameters, in particular, the Tx power. In order to maintain a same ratio of Tx power among all luminaires when Tx power cannot be increased for some of the luminaires, the Tx power has to be decreased for some other luminaires, e.g. table lights. This can allow to obtain a similar overall RF-based sensing effect.

Reducing Tx power may generate connectivity issues, such that some luminaires may no longer be able to connect to the Hue bridge or a gateway, or such that health of the mesh network degrades. These node parameters can additionally be considered by the wireless parameter adjustment device when adjusting the wireless parameters. For example, a cap or maximal reduction rate for Tx power can be provided, such that the overall proportion of the wireless transmission performance remains as close to desired but with minimum impact on the connectivity of the nodes of the wirelessly connected system.

In another embodiment, the wireless parameter adjustment device adjusts the wireless parameters based on an amount of nodes, such as luminaires at different relative locations. For example, in a situation where there is a single ceiling mounted luminaire but four table lights distributed in a room, the overall relative increase of Tx power of the ceiling mounted luminaire will be deemed higher than if there were three ceiling mounted luminaires. This allows ensuring that the RF-based sensing spatial wireless performance throughout the volume covered by the luminaires is as homogeneous as possible. In practice, this can allow a person to be detected with equal confidence levels throughout the entire room, as opposed to having blind spots in the center due to the proportionally lower relative wireless transmission performance of the ceiling mounted luminaire.

In another embodiment, the wirelessly connected system is optimized for reducing detection of false positive events. For example, it is undesirable that when a user walks into his bedroom, the luminaires in the adjacent room of his kid detect the presence and activate. The wirelessly connected system can infer that based on the relative location of the luminaires, some of them are more likely to detected false positives events than others. For example, wall mounted luminaires are more likely to detect false positive events than ceiling mounted luminaires. This results, as leakage of RF signals from wall mounted luminaires is higher than for ceiling mounted luminaires as the RF signals have a higher signal strength in adjacent volumes that are not to be covered than ceiling mounted luminaires since in most buildings floor construction materials tend to absorb RF signals more than those of walls. The wireless parameter adjustment device can adjust the wireless parameters taking into account this leakage probability or a probability of detecting an event in a volume not to be covered by the nodes.

Additionally, Tx power for a wall mounted luminaire can be adjusted in real time and based on a confidence level of the detected presence. For example, if a luminaire is arranged at a wall in one room and close to an adjacent room and presence is detected with low confidence in the two rooms, Tx power of the luminaire arranged at the wall may be decreased to ensure that the presence was not detected due to leakage of the RF signal to the adjacent room. While if presence is detected with high confidence, the TX may not need to be adjusted.

In another embodiment, the wireless adjustment device can adjust the wireless parameters additionally based on different materials included in the respective nodes. The different materials can affect the wireless performance of the luminaires. For example, recessed luminaires for GU10 spots are usually metallic to help dissipating heat from the luminaire. As such, that luminaire will tend to confine RF signals, resulting in a directional RF signal transmission. In case that the same spot is used in a luminaire made from glass, the RF signal transmission is more homogeneous. The wireless adjustment device can adjust the wireless parameters additionally taking into account inherent directionality of the node, e.g., based on a light source design. For example, a spot can always be more directional in RF signal transmission by design than an A19 bulb. Additionally, the wireless adjustment device adjusts the wireless parameters taking into account the relative location of the luminaire, which includes the position of the luminaire and its environment, such as materials in its environment. Relative locations and materials can be inserted by the user or can be automatically determined, e.g., using the image analysis unit and camera of the wirelessly connected system. The user can input relative locations and materials, for example, by selecting these from a list of options including materials, model and brand, or the like. The image analysis unit can determine relative locations and materials by analyzing images received from the camera. The images include the luminaire or luminaires and/or the room. The directionality may be compensated by adjusting the wireless parameters in order to reduce blind spots.

In another embodiment, the nodes include multiple antennas, e.g., for WiFi in the 2.4 GHz band and WiFi in the 5 GHz band and/or can use different parts of the frequency spectrum, such as different frequency channels and the wireless adjustment device can adjust these wireless parameters in order to optimize the wireless performance. For example, if a room contains a large amount of luminaires including metallic materials that use WiFi in the 2.4 GHz band, the wireless adjustment device may adjust the wireless parameters by changing from the 2.4 GHz band to the 5 GHz band. This may allow to improve a penetration of the RF signals and may allow to reduce directionality of the RF signals.

In another embodiment, the wireless adjustment device repeatedly adjusts the wireless parameters whenever a trigger event occurs. Trigger events can include a user to select a wireless parameter adjustment, a luminaire being activated, deactivated, replaced, removed, malfunctioning or the like. For example, the wirelessly connected system performs RF-based sensing in a living room. During daytime the wirelessly connected system activates luminaires automatically based on presence, but at nighttime the wirelessly connected system detects intruders and activates flashing lights as a warning or deterrent. Alternatively, adjustment of the wireless parameters may also be done statically. In a use case of this embodiment, a user may turn off a ceiling luminaire via a wall switch next to the living room door. As a result, the wirelessly connected system is less reliable, as less RF signals are transmitted for performing RF-based sensing. The wirelessly connected system can detect whether a node does not contribute to RF-based sensing, because it is for example deactivated. Therefore, the wirelessly connected system for example measures a reachability, detects missed messages, or detects non-acknowledged (ACK) messages over a predetermined period, such as a few minutes. If it is detected that a node, in this case the ceiling luminaire, does not contribute to RF-based sensing, the wireless parameter adjustment device can adjust the wireless parameters of the other luminaires accordingly, e.g., by adjusting the wireless parameters of the other luminaires, such that they maintain the same or at least a similar wireless performance as before. For example, if Tx power of other luminaires was reduced when the ceiling luminaire was contributing to RF-based sensing, the Tx power of the other luminaires may be restored to increase a resolution of the wirelessly connected system.

Figure 3:
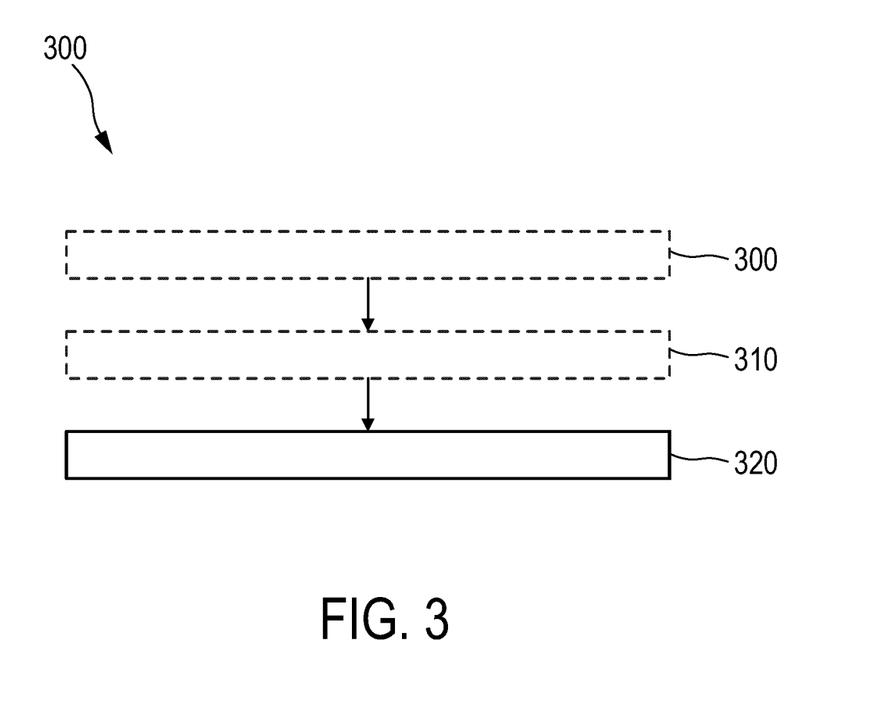
FIG. 3 shows an embodiment of a method for adjusting one or more wireless parameters of one or more nodes of a wirelessly connected system.

FIG. 3 shows an embodiment of a method 300 for adjusting one or more wireless parameters of one or more nodes of a wirelessly connected system, e.g. of the CL system 100 presented in FIGS. 1A and 1B. The nodes transmit RF signals, receive RF signals, or both.

In step 310, the relative location of the nodes is determined. Alternatively one or more node parameters including a relative location of the one or more of the nodes can be determined. Step 310 is optional.

In step 320, a probability of detecting presence of a person in a volume not to be covered by the nodes is determined based on the node parameters including the relative location of the nodes. Step 320 is optional.

In step 330, the Tx power of the nodes is reduced based on the relative locations of the nodes and their probability of detecting presence of a person in a volume not to be covered by the nodes such that a signal strength of the RF signals outside of a volume that is to be covered by the nodes is below a threshold signal strength. This reduces the probability of detecting presence of a person in a volume not to be covered by the nodes. Alternatively one or more wireless parameters of one or more of the nodes can be adjusted based on one or more node parameters including a relative location of the one or more of the nodes, such that the wireless performance of the one or more of the nodes is optimized for an application of the wirelessly connected system. For example, wireless parameters can also be adjusted for optimizing wireless communication between nodes of a group of nodes in the wirelessly connected system. In particular, leakage of RF signals outside of a volume covered by a group of nodes can be reduced in order to increase data security and to reduce signal disturbances.

In other embodiments, adjusting of the one or more wireless parameters of the one or more of the nodes can be performed under an additional requirement, namely, such that a signal parameter of the RF signals outside of a volume that is to be covered by the one or more of the nodes has a value below a threshold value. Signal parameters can for example be or include a signal strength, SNR, carrier frequency shift, carrier frequency bandwidth, or any other signal parameter.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein the RF-based sensing system is a heating ventilation air conditioning (HVAC) system or any other type of home automation system. The invention may also be operated in any other wirelessly connected system, for example, including security cameras, speakers, voice assistants, door locks, smartphones, tablets, or any other wireless devices.

Other variations to the disclosed embodiments can be understood and effected by those skilled in the art in practicing the claimed invention, from a study of the drawings, the disclosure, and the appended claims.

In the claims, the word "comprising" and "including" does not exclude other elements or steps, and the indefinite article "a" or "an" does not exclude a plurality.

A single unit, processor, or device may fulfill the functions of several items recited in the claims. The mere fact that certain measures are recited in mutually different dependent claims does not indicate that a combination of these measures cannot be used to advantage.

Operations like adjusting the one or more wireless parameters of one or more of the nodes based on one or more node parameters including a relative location of the one or more of the nodes, such that the wireless performance of the one or more of the nodes is optimized for an application of the wirelessly connected system, determining one or more node parameters including a relative location of the one or more of the nodes, determining a probability of detecting an event in a volume not to be covered by the one or more of the nodes based on the one or more node parameters including the relative location of the nodes et cetera performed by one or several units or devices can be performed by any other number of units or devices. These operations and/or the method can be implemented as program code means of a computer program and/or as dedicated hardware.

A computer program product may be stored/distributed on a suitable medium, such as an optical storage medium, or a solid-state medium, supplied together with or as part of other hardware, but may also be distributed in other forms, such as via the Internet, Ethernet, or other wired or wireless telecommunication systems.

Any reference signs in the claims should not be construed as limiting the scope.

The present invention relates to adjusting one or more wireless parameters of one or more nodes based on one or more node parameters including a relative location of the one or more of the nodes. The nodes are wirelessly connected in a wirelessly connected system and configured for transmitting RF signals, receiving RF signals, or both. The one or more wireless parameters are adjusted such that the wireless performance of the one or more of the nodes is optimized for an application of the wirelessly connected system. Tx power can be adjusted such that a probability of detecting an event in a volume not to be covered by the one or more of the nodes is reduced, allowing reduction of false positives from adjacent volumes.

The invention claimed is:

1. A wireless parameter adjustment device for a wirelessly connected system including wirelessly connected nodes for transmitting radio frequency signals, receiving radio frequency signals, or both,
   wherein the wireless parameter adjustment device is configured for adjusting one or more wireless parameters of one or more of the nodes based on one or more node parameters including a relative location comprising a position of a node with respect to the one or more of the nodes or the one or more objects influencing the radio frequency signals, such that the wireless performance of the one or more of the nodes is optimized for a radio frequency-based sensing and/or asset tracking application of the wirelessly connected system; and
   wherein the one or more of the nodes are configured for performing radio frequency-based sensing and/or asset tracking; and wherein wireless parameter adjustment device is configured for adjusting the one or more wireless parameters of the one or more of the nodes based on a distance to a center of a volume that is to be covered by the one or more nodes, such that a probability of detecting an event, via the radio frequency-based sensing, in a volume not to be covered by the one or more of the nodes is reduced.

2. The wireless parameter adjustment device according to claim 1, wherein the one or more wireless parameters include one or more of:
   transmission power,
   number of antennas used for generating radio frequency signals,
   type of antennas used for generating radio frequency signals,
   frequency channel or frequency channels,
   bandwidth,
   reception sensitivity.

3. The wireless parameter adjustment device according to claim 1, wherein the one or more node parameters include one or more of:
   an orientation of the one or more of the nodes,
   an antenna design of the one or more of the nodes,
   a directionality of a radio frequency signal generated by the one or more of the nodes,
   a polarization of a radio frequency signal generated by the one or more of the nodes,
   a multiple input multiple output characteristic of the one or more of the nodes,
   one or more materials of the one or more of the nodes,
   a connectivity of the one or more of the nodes to one or more other nodes,
   a probability of detecting an event in the volume not to be covered by the one or more of the nodes,
   a confidence level of an event detected by the one or more of the nodes,
   a contextual parameter of the one or more of the nodes,
   an amount of nodes at different relative locations,
   a current transmission power,
   a frequency channel or frequency channels,
   bandwidth,
   a current reception sensitivity.

4. The wireless parameter adjustment device according to claim 1, configured for adjusting the one or more wireless parameters of the one or more of the nodes, such that a signal parameter of the radio frequency signals outside of the volume that is to be covered by the one or more of the nodes has a value below a threshold value.

5. The wireless parameter adjustment device according to claim 1, configured for determining a probability of detecting an event in the volume not to be covered by the one or more of the nodes based on the one or more node parameters including the relative location of the one or more of the nodes.

6. The wireless parameter adjustment device according to claim 1, configured for adjusting the one or more wireless parameters of the one or more nodes if a trigger event is detected.

7. A wirelessly connected system comprising:
   two or more nodes configured for transmitting radio frequency signals, receiving radio frequency signals, or both, and the wireless parameter adjustment device according to claim 1.

8. The wirelessly connected system according to claim 7, wherein each of the nodes is configured for initially transmitting radio frequency signals with maximal transmission power, and
  wherein the wireless parameter adjustment device is configured for decreasing the transmission power of one or more of the nodes based on the one or more node parameters including the relative location comprising a position of a node with respect to the one or more of the nodes or the one or more objects influencing the radio frequency signals;
  wherein the wirelessly connected system is configured for performing radio frequency-based sensing, asset tracking, or both.

9. The wirelessly connected system according to claim 7, further comprising:
  a camera for imaging an arrangement of the nodes, the nodes, or both, and
  an image analysis unit for determining one or more of: a relative location of one or more of the nodes, a material of one or more of the nodes, an orientation of one or more of the nodes, an amount of nodes at different relative locations.

10. A method for adjusting one or more wireless parameters of one or more nodes of a wirelessly connected system in which the nodes are configured for transmitting radio frequency signals, receiving radio frequency signals, or both, and
  wherein the method comprises:
    determining one or more node parameters including a relative location comprising a position of a node with respect to the one or more of the nodes or the one or more objects influencing the radio frequency signals,
    adjusting the one or more wireless parameters of one or more of the nodes based on one or more node parameters including the relative location, such that the wireless performance of the one or more of the nodes is optimized for a radio frequency-based sensing and/or asset tracking application of the wirelessly connected system; and
  wherein the one or more of the nodes are configured for performing radio frequency-based sensing and/or asset tracking; and wherein wireless parameter adjustment device is configured for adjusting the one or more wireless parameters of the one or more of the nodes based on a distance to a center of a volume that is to be covered by the one or more nodes, such that a probability of detecting an event, via the radio frequency-based sensing, in a volume not to be covered by the one or more of the nodes is reduced.

11. A computer program product for adjusting one or more wireless parameters of one or more nodes of a wirelessly connected system, in which the nodes are configured for transmitting radio frequency signals, receiving radio frequency signals, or both, wherein the computer program product comprises a non-transitory computer readable medium storing instructions when executed by a processor cause the processor to carry out the method as defined in claim 10.

* * * * *